Jan. 9, 1940. P. F. SPERRY 2,186,562
AIR CONDITIONER
Filed Dec. 31, 1937   4 Sheets-Sheet 1

Inventor:
Philmore F. Sperry,
By:
Zabel, Carlson, Fitzbaugh & Wells
Attorneys

Jan. 9, 1940. P. F. SPERRY 2,186,562
AIR CONDITIONER
Filed Dec. 31, 1937 4 Sheets-Sheet 2
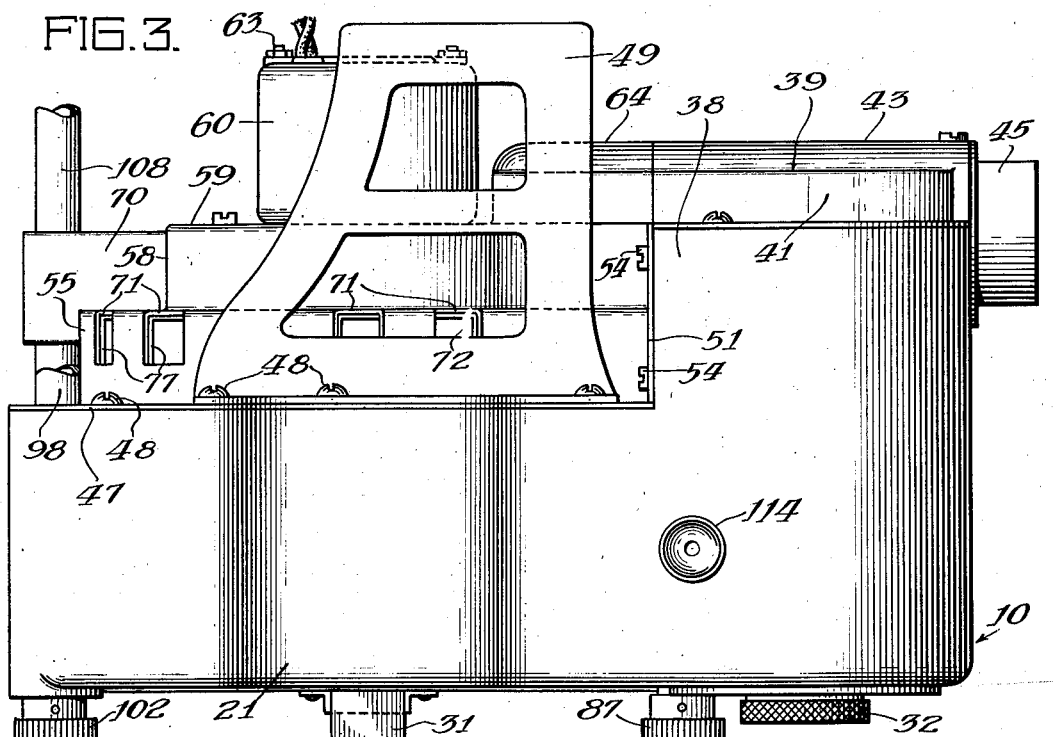
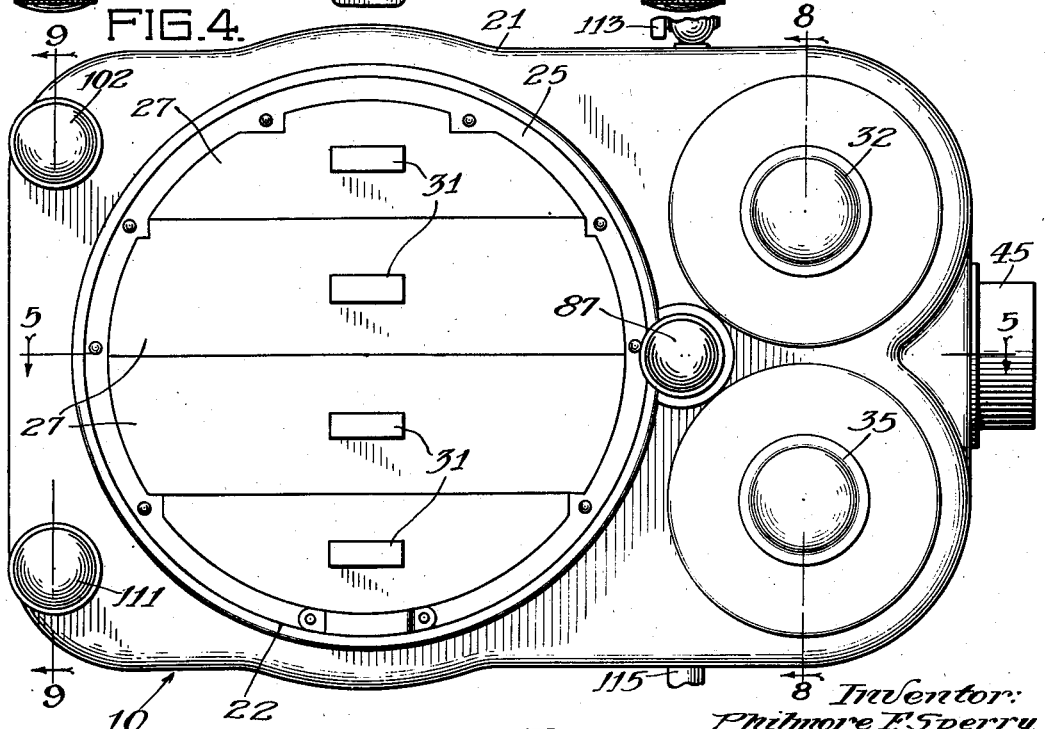
Inventor:
Philmore F. Sperry,
By Zabel, Carlson, Gickbaugh & Wells
Attorneys Jan. 9, 1940.  P. F. SPERRY  2,186,562
AIR CONDITIONER
Filed Dec. 31, 1937  4 Sheets-Sheet 3

Inventor:
Philmore F. Sperry.
By Zabel, Carlson, Gutbaugh & Wells
Attorneys

Jan. 9, 1940.  P. F. SPERRY  2,186,562
AIR CONDITIONER
Filed Dec. 31, 1937  4 Sheets-Sheet 4

Inventor:
Philmore F. Sperry.
By Zabel, Carlson, Fitzbaugh & Wells
Attorneys

Patented Jan. 9, 1940

2,186,562

UNITED STATES PATENT OFFICE 2,186,562

AIR CONDITIONER

Philmore F. Sperry, Chicago, Ill., assignor to Excel Auto Radiator Company, Chicago, Ill., a corporation of Delaware Application December 31, 1937, Serial No. 182,781

4 Claims. (Cl. 62—134)

The present invention relates to heat exchange devices, and is particularly directed toward devices of this character which are employed in automobiles for either heating or cooling purposes for maintaining the proper temperature in the passenger compartment thereof.

One form of the invention is shown as embodied in a heat exchange device of the character described, which device comprises a radiator unit having connections whereby it may be connected in the cooling water system of the automobile. The device has also a motor driven fan for circulating air through the radiator in both directions, a portion of the air being driven directly into the passenger compartment of the automobile and a portion of the air being driven to a conduit through which it may be directed to a particular part of the vehicle, such as the wind shield, for heating the particular part. The device shown embodies also a valve means whereby the cooling water system may be cut off from the radiator, and if desired, other fluid may be used to fill the radiator in using the device for extracting heat from the air.

An air inlet is provided from the exterior of the vehicle to the fan, whereby fresh air may be drawn into the vehicle compartment. The device is also provided with storage compartments associated with the radiator for the storage of a cooling medium. Owing to its availability the cooling medium may be the so called "dry ice," which is carbon dioxide in solid form. The storage space in the device is so arranged that the cooling material, whether it be dry ice or some other suitable material such, for example, as ordinary ice, may be readily inserted with a minimum amount of difficulty, thus making it simple to service the device and replace the cooling medium.

For the purpose of servicing the device with the cooling medium, it is contemplated that service stations may be equipped with machines for producing carbon dioxide in solid form as needed and for compressing the carbon dioxide into blocks of the requisite shape and size. In order to accommodate the device for this kind of service, it has been provided with special containers that are removable so that they may be readily filled and replaced.

The purposes and advantages of the invention will appear more fully as the description proceeds, reference being had to the accompanying drawings, wherein a preferred form of the invention is shown.

In the drawings,

Fig. 3 is a top plan view of the heat exchange device;

Fig. 4 is a front view of the device;

Figure 1:
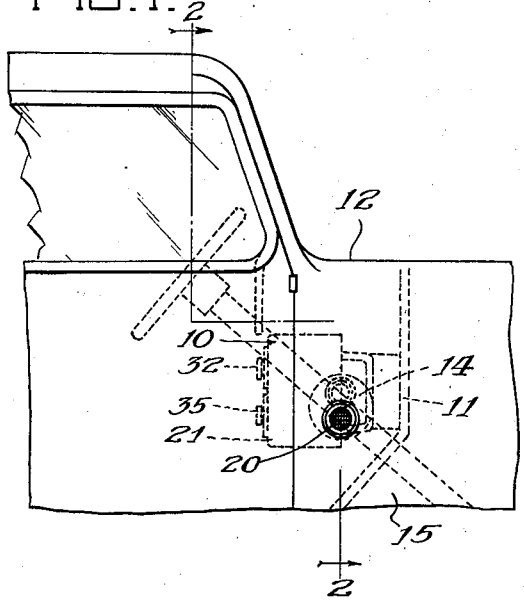
Fig. 1 is a fragmentary view in side elevation of a portion of a passenger automobile, illustrating the position of the present device therein.
Figure 2:
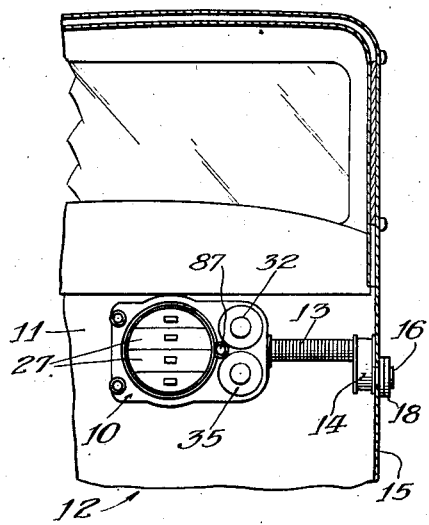
Fig. 2 is a fragmentary sectional view taken on the line 2—2 of Fig. 1.

Referring now to the drawings, the invention is shown as embodied in a heat exchange device 10 which is mounted in any suitable fashion upon the dash 11 of a passenger automobile 12. The heat exchange device 10 is connected by a flexible conduit 13 to an air filtering container 14 which is secured to a portion 15 of the hood of the automobile. The container 14 has a screw threaded sleeve 16 projecting through the hood portion 15 and clamped to the hood portion by a nut 17 which is locked in place by a lock nut 18. The container 14 may be filled with a suitable filtering material such, for example, as metal wool 19. A screen 20 covers the opening of the sleeve 16 through the container 14. The container 14 is so arranged that its connection to the flexible conduit 13 is above the sleeve 16, in order to prevent rain or snow from entering the conduit 13.

Figure 5:
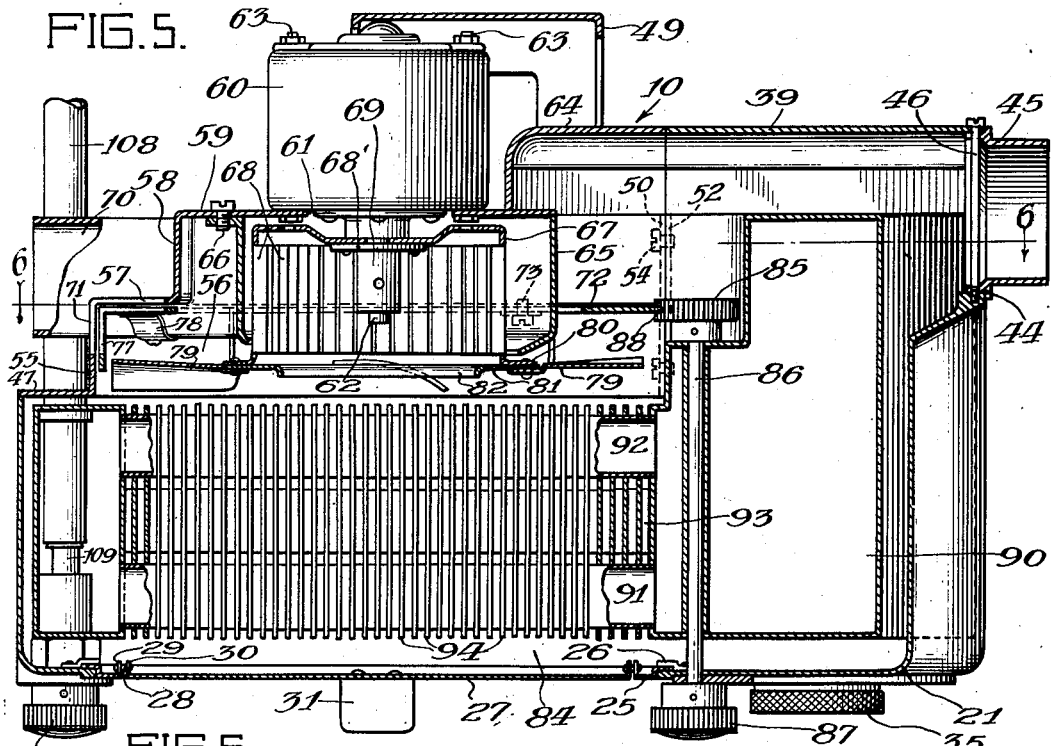
Fig. 5 is a horizontal sectional view taken on the line 5—5 of Fig. 4.

The heat exchange device 10 comprises a cup-shaped casing 21. The casing 21 has three openings 22, 23 and 24 in the front thereof. The opening 22 is fitted with a ring 25 which is held in place by a series of clips 26 (see Fig. 5) so that it may be rotated in the opening 22. The ring 25 carries a plurality of vanes 27 (see Fig. 4) which are hinged to the ring by hinge pins 28 and ears 29 and 30 formed upon the ring and the vanes respectively, as is shown in Fig. 5. Each of the vanes 27 has a finger piece 31 thereon by which it may be pulled out or pushed inwardly to control the flow of air through the opening 22.

Figure 6:
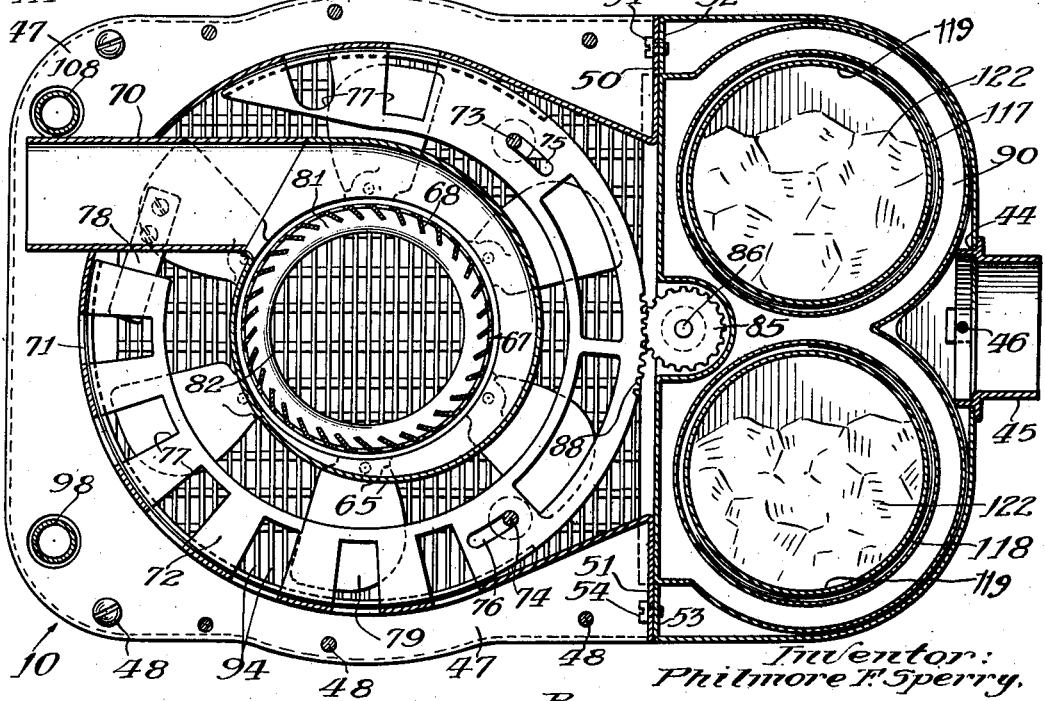
Fig. 6 is a vertical sectional view taken on the line 6—6 of Fig. 5.
Figure 7:
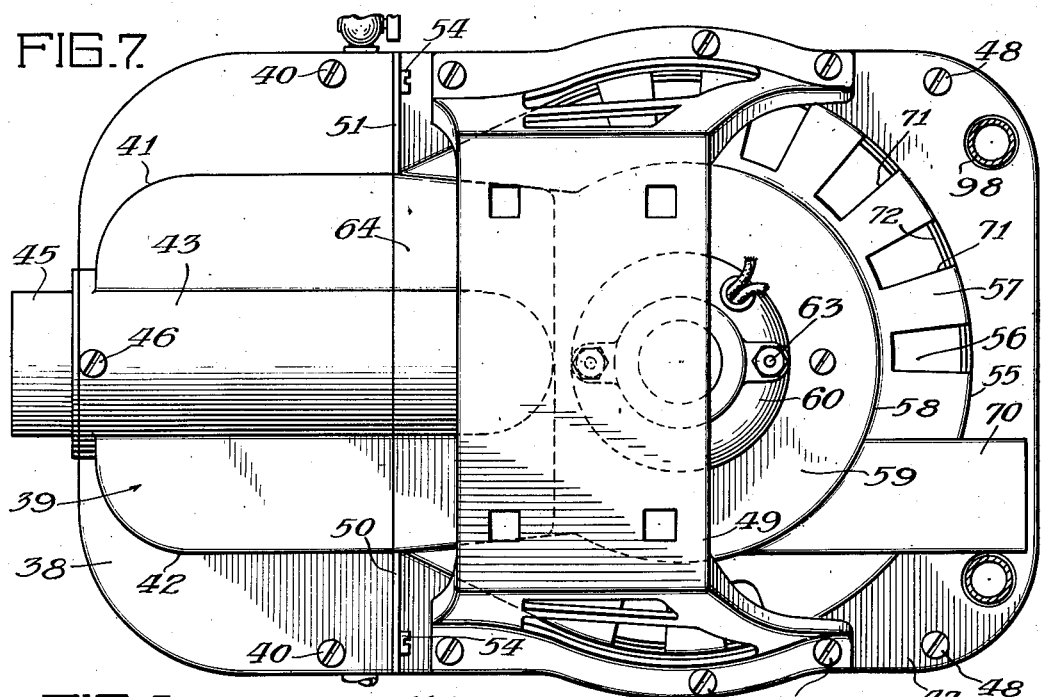
Fig. 7 is a rear view of the device.
Figure 8:
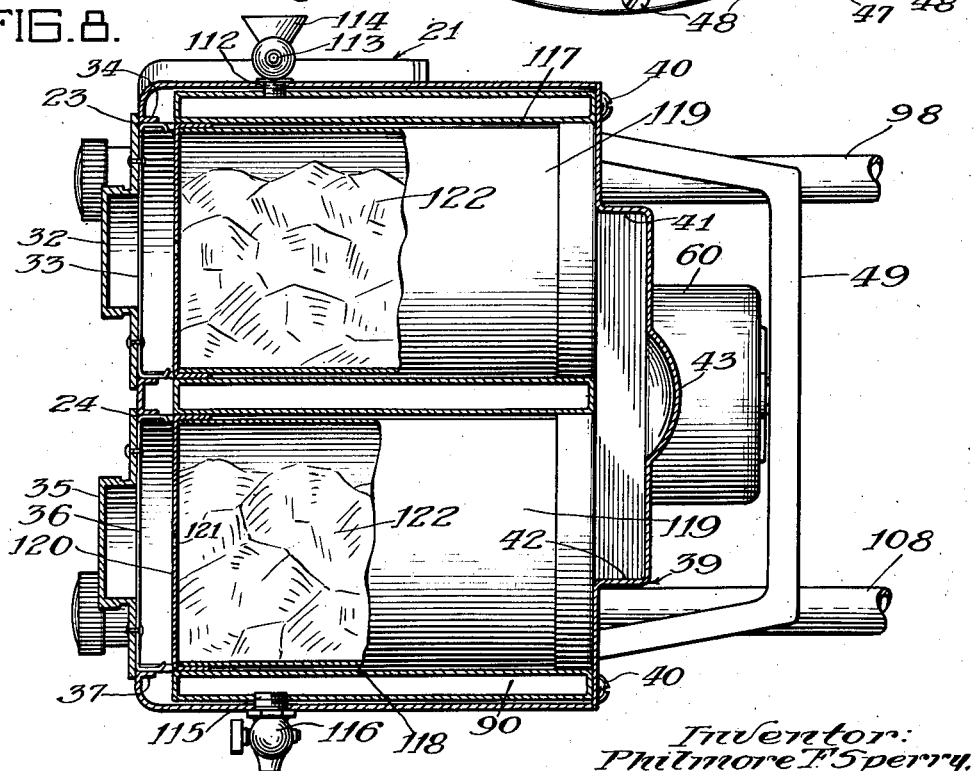
Fig. 8 is a vertical sectional view taken on the line 8—8 of Fig. 4.

The opening 23 is closed by a cap 32 (see Figs. 4 and 8) which carries a spring clip 33 that engages an inturned flange 34 around the opening 23. The opening 24 is closed with a similar cap 35 which also carries a spring clip 36 for engaging a flange 37 around the opening 24. At the rear of the casing 21 the casing is extended near one end as shown at 38 (see Fig. 3) and is closed by a cover 39. The cover 39 is secured to the casing 21 by suitable screws 40, as shown in Fig. 7. The cover 39 is pressed out at 41 and 42 and enlarged further at 43 to provide an inlet passage, as will be more fully described hereinafter. Opposite the enlargement 43, the portion 38 of the casing 21 is provided with a semi-circular recess 44 in which a connecting nipple 45 is fitted. The nipple 45 is held in place by a screw bolt 46 which extends through the enlarged portion 43 of the cover 39 and through the nipple 45 into the casing 21. The nipple 45 receives the conduit 13 to establish connection to the interior of the casing 21 from the filter container 14. A back cover plate 47 is secured to the casing 21 and extends from the cover 39 to the opposite end of the casing 21. This cover plate 47 is fastened to the casing 21 by screws 48 which also secure a mounting bracket 49 to the casing 21. The cover plate 47 has two end flanges 50 and 51 at the top and bottom portions respectively (see Fig. 6) which abut corresponding flanges 52 and 53 which are formed on the extended portion 38 of the casing 21. A plurality of screws 54 secure the flanges together to complete the enclosure. The cover plate 47 is offset backwardly at 55 (see Fig. 5 at the left) to provide a fan chamber 56 and is extended inwardly over the fan chamber 56 as shown at 57 and is then offset backwardly again at 58. At the rear edge of the offset portion 58 the cover plate 47 has a flat portion 59 upon the rear face of which a fan motor 60 is mounted. The flat portion 59 has an opening 61 through which the motor shaft 62 extends. The motor 60 is secured to the flat portion 59 by suitable bolts 63 extending through the motor casing. The flat rear wall portion 59 is connected to the extension rear cover member 39 by a dished casing portion 64 which abuts the cover member 39 and fits upon the portion 59 of the plate 47, as is shown in Figs. 5 and 7.

A fan housing 65 is supported on the portion 59 of the plate 47, being secured thereto by suitable screws 66. Within the housing 65 there is a fan 67 having its blades 68 arranged to draw air in axially of the fan, and discharge the air outwardly into the housing 65. The fan 67 is fixed to a flange 68' of a hub 69 that is fixed upon the motor shaft 62. The housing 65 has a tangential outlet 70 which extends through the offset portion 58 of the plate 47 and beyond the plate 47 where it may be connected to any suitable conduit for directing the air to the proper place.

As shown in Fig. 7, the portions 55 and 57 of the plate 47 have slots 71 therein, these slots being provided to admit air to the fan chamber 56. A movably mounted closure plate 72 shown in detail in Fig. 6 is adapted to regulate the degree of opening of the slots 71. The plate 72 is secured to the portion 57 of the plate 47 by headed screws 73 and 74 which are threaded into the portion 57 and which ride in slots 75 and 76 in the plate 72. The plate 72 is provided with a plurality of apertures 77 that are located behind the slots 71, and by moving the plate 72 to bring the apertures 77 more or less into alignment with the slots 71, the amount of opening for letting air into the fan chamber 56 may be controlled. The plate 72 is yieldingly pressed against the portion 57 of the cover plate 47 by a leaf spring 78 that is mounted on the outlet 70. The fan 67 carries a series of fan blades 79 which are arranged in the chamber 56 in front of the housing 65. The blades 79 are riveted to an out-turned flange 80 on the fan 67. Between the flange 80 and the blades 79 a ring 81 is secured. This ring 81 has a forwardly-turned lip 82 around its inner periphery. The fan construction is such that the blades 79 force the air forwardly as shown in Fig. 5 so as to drive the air through a radiator unit 84 while the fan blades 68 tend to force the air outwardly through the housing 65, and thus create a suction backwardly through the ring 81, to draw air backwardly through the radiator unit 84. The plate 72 may be adjusted by means of a gear 85 carried by a shaft 86 that extends out at the front of the casing 21 and carries a handle 87. The plate 72 has teeth 88 cut at its periphery to cooperate with the gear 85.

Figure 9:
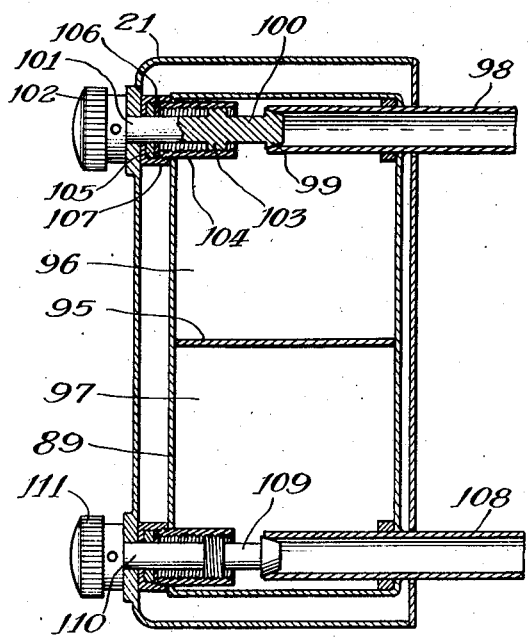
Fig. 9 is a vertical sectional view taken on the line 9—9 of Fig. 4.
Figure 10:
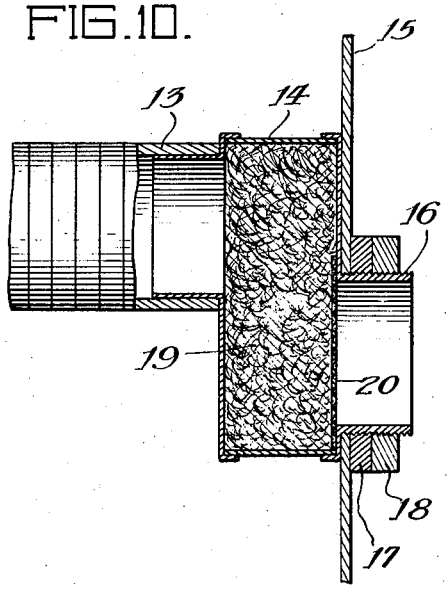
Fig. 10 is an enlarged fragmentary sectional view through the air inlet for the device, showing the mounting thereof in the wall of the passenger automobile.

The radiator unit 84 comprises spaced headers 89 and 90 which are connected by a multiplicity of horizontally extending tubes 91, 92 and 93, the header 89 being shown in Fig. 9 and the header 90 at the right in Figs. 5 and 6. The tubes 91, 92 and 93 are flattened and are arranged in a plurality of rows, the tubes 91 being near the front, while the tubes 92 are near the back, and the third row of tubes 93 are between the first two mentioned rows. Radiating fins 94 are carried by the tubes 91, 92 and 93, as will be readily understood. The header 89 is divided by a partition 95 (see Fig. 9) into upper and lower compartments 96 and 97. The pipe 98 provides an inlet to the upper compartment 96. The pipe 98 has its inner end provided with a seat 99 for a valve 100. The valve 100 is provided with a stem 101 which projects out through the header 89 and through the casing 21 where it is provided with a knurled knob 102. The stem 101 of the valve 100 has an enlarged screw threaded portion 103, which is threaded in a sleeve 104 that is carried by the header 89 and sealed thereto with a water tight joint. In order to prevent leaking around the valve stem 101, a gasket 105 and a washer 106 are held in place around the stem 101 by a cap 107 that is threaded onto the outer end of the sleeve 104. An outlet pipe 108 extends into the header 89 in the compartment 97 and is controlled by a valve 109 which has a stem 110 provided with a knob handle 111 similar to the knob 102 for the valve 100. The two valve constructions are identical, and it is believed that they need not be further described. When the valves 100 and 109 are open, and the pipes 98 and 108 are connected to the cooling water system of the automobile engine, the hot water from this system will be circulated from the pipe 98 through the compartment 96 and the upper tubes 91, 92 and 93 that connect with this compartment, then downwardly through the header 90 and back through the lower tubes 91, 92 and 93 to the compartment 97 where it may return by the pipe 108.

The header 90 is provided at its top with an inlet 112 (see Fig. 8) which is controlled by a valve 113 and which has a filling funnel 114. At the bottom of the header 90 an outlet fixture 115 is provided. A valve 116 controls the outlet 115. The header 90 has two annular passages 117 and 118 extending through it from front to back. These passages are directly opposite and in line with the openings 23 and 24. At the back side, the passages 117 and 118 open upon the air passage from the nipple 45 in front of back cover 39. Thus, if a cooling material is placed in the passages 117 and 118, air coming in through the nipple 45 is directed across the back of the passages to be initially cooled at this point.

To conveniently supply cooling media in the passages 117 and 118, there is provided a container 119 for each passage. This container has a removable cover 120 which is provided with a vent opening 121 for the escape of gases when the container is filled with a substance such as dry ice. As illustrative of the use of the device, a quantity of dry ice is shown at 122 in each of the containers 119.

It is believed to be evident from the foregoing description that the containers 119, when filled with a suitable cooling material such as dry ice, will act to cool any liquid in the header 90. The passages 117 and 118 are completely encircled by the header 90. As the liquid is cooled in the header 90, it will of course tend to circulate through the tubes 91, 92 and 93, and air blown across these tubes will be cooled. Thus, it is evident that the device can be used to draw fresh air into a car through the filter container 14 and cool the air before discharging it into the interior of the car. It is contemplated that when the device is used for cooling air, the water from the cooling water system of the engine will be drawn out of the headers 89 and 90, and with the valves 100 and 109 closed, another liquid such as alcohol will be used to fill the radiator core.

While a preferred form of the invention has been shown and described, it is to be understood that it is capable of many modifications. Changes, therefore, in the construction and arrangement may be made without departing from the spirit and scope of the invention as disclosed in the appended claims in which it is the intention to claim all novelty inherent in the invention as broadly as possible in view of the prior art.

Having thus described my invention what I claim as new and desired to secure by Letters Patent is:

1. A heat exchange device for automobiles, comprising in combination two headers in horizontally spaced relation to each other, a series of tubular connecting members from one header to the other in mutually spaced relation to each other, adapted with said headers to hold a supply of liquid and arranged at different levels so as to encourage the circulation of the liquid from one header to the other, means for holding a supply of refrigerant in effective position with respect to one of said headers for a ready transfer of heat from the liquid thereto, and means for forcing air through the spaces between said tubular connecting members.

2. A heat exchange device for automobiles, comprising in combination two headers in horizontally spaced relation to each other, a series of tubular connecting members from one header to the other in mutually spaced relation to each other adapted with said headers to hold a supply of liquid and arranged at different levels so as to encourage the circulation of the liquid from one header to the other, a tubular member extending through one of said headers for the reception of a supply of refrigerant in effective position for a ready transfer of heat from the liquid thereto, and means for forcing air through the spaces between said tubular connecting members.

3. A heat exchange device for automobiles, comprising in combination two headers in horizontally spaced relation to each other, a series of tubular connecting members from one header to the other in mutually spaced relation to each other adapted with said headers to hold a supply of liquid and arranged at different levels so as to encourage the circulation of the liquid from one header to the other, two sleeves extending through one of said headers one in spaced relation above the other, two receptacles removably mounted in said sleeves for holding a supply of refrigerant in effective position for the ready transfer of heat from the liquid thereto, and means for forcing air through the spaces between said tubular connecting members.

4. A heat exchange device for automobiles, comprising in combination two headers in horizontally spaced relation to each other, a series of tubular connecting members from one header to the other in mutually spaced relation to each other adapted with said headers to hold a supply of liquid and arranged at different levels so as to encourage the circulation of the liquid from one header to the other, sleeves extending through one of said headers one in spaced relation above the other, two receptacles removably mounted in said sleeves for holding a supply of refrigerant in effective position for a ready transfer of heat from the liquid thereto, a casing about said connected headers having openings opposite said sleeves for the insertion of said receptacles, removable closure means for said openings, means for forcing air through the spaces between said tubular connecting members for cooling the air by contact with the tubular members, and other means for forcing air through said casing for cooling such air by contact with said receptacles.

PHILMORE F. SPERRY.